(12) United States Patent
Nagai et al.

(10) Patent No.: US 9,637,407 B2
(45) Date of Patent: May 2, 2017

(54) MOLTEN GLASS CONDUIT STRUCTURE, AND DEVICE AND METHOD USING CONDUIT STRUCTURE

(71) Applicant: ASAHI GLASS COMPANY, LIMITED, Tokyo (JP)

(72) Inventors: Kensuke Nagai, Tokyo (JP); Hiroaki Hamamoto, Tokyo (JP); Shuji Kabashima, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 0 days.

(21) Appl. No.: 14/920,910

(22) Filed: Oct. 23, 2015

(65) Prior Publication Data

US 2016/0039702 A1 Feb. 11, 2016

Related U.S. Application Data

(63) Continuation of application No. PCT/JP2014/058350, filed on Mar. 25, 2014.

(30) Foreign Application Priority Data

Apr. 24, 2013 (JP) ................................. 2013-091280

(51) Int. Cl.
| | |
|---|---|
| *C03B 15/06* | (2006.01) |
| *C03B 5/225* | (2006.01) |
| *C03C 3/087* | (2006.01) |
| *C03B 5/43* | (2006.01) |
| *C04B 35/101* | (2006.01) |
| *C04B 35/106* | (2006.01) |

(52) U.S. Cl.
CPC .............. *C03B 5/2252* (2013.01); *C03B 5/43* (2013.01); *C03C 3/087* (2013.01); *C04B 35/101* (2013.01); *C04B 35/106* (2013.01); *C04B 2235/3201* (2013.01); *C04B 2235/3232* (2013.01); *C04B 2235/3272* (2013.01); *C04B 2235/3418* (2013.01); *C04B 2235/72* (2013.01); *C04B 2235/77* (2013.01); *C04B 2235/94* (2013.01); *C04B 2235/95* (2013.01); *C04B 2235/96* (2013.01); *C04B 2235/9607* (2013.01)

(58) Field of Classification Search
CPC    C03B 15/06; C03B 5/225; C03B 5/43; C03C 3/087
USPC .................... 65/134.9, 346, 374.13
See application file for complete search history.

(56) References Cited

U.S. PATENT DOCUMENTS

| | | | |
|---|---|---|---|
| 2,186,223 A | 1/1940 | Willetts | |
| 6,334,336 B1 | 1/2002 | Takei et al. | |
| 6,948,338 B2* | 9/2005 | Sakai .................... | C03B 5/2252 |
| | | | 266/210 |
| 7,000,432 B2* | 2/2006 | Itoh ....................... | C03B 5/2252 |
| | | | 65/134.2 |

(Continued)

FOREIGN PATENT DOCUMENTS

| | | |
|---|---|---|
| CN | 102442756 A | 5/2012 |
| JP | 64-18937 | 1/1989 |
| JP | 2-180719 | 7/1990 |

(Continued)

OTHER PUBLICATIONS

International Search Report issued Jul. 1, 2014 in PCT/JP2014/058350 filed Mar. 25, 2014.

(Continued)

*Primary Examiner* — Mark Halpern
(74) *Attorney, Agent, or Firm* — Oblon, McClelland, Maier & Neustadt, L.L.P.

(57) ABSTRACT

There are provided a conduit structure for molten glass, a vacuum degassing apparatus using the conduit structure, and a process for vacuum-degassing molten glass by use of the vacuum degassing apparatus, wherein without using a cooling system, solid thermal insulating materials constituting a backup for the conduit are prevented from being corroded by molten glass oozing out of a joint between adjacent fused cast refractories constituting the conduit, and wherein production cost is reduced.

A conduit structure for molten glass, comprising a conduit and a backup disposed around the conduit; the conduit being a hollow pipe made of fused cast refractories disposed in longitudinal and circumferential directions thereof; the backup comprising a refractory layer outside the conduit, and a thermal insulating material layer disposed outside the refractory layer; the refractory layer including a refractory brick layer made by placing refractory bricks along the longitudinal and circumferential directions of the conduit, and a monolithic refractory layer formed by placing a monolithic refractory containing from 30 to 100% of $Al_2O_3$ and from 0 to 70% of $SiO_2$ in percent by mass on an oxide basis and sintering the monolithic refractory;
   the thermal insulating material layer containing a solid thermal insulating material layer made of solid thermal insulating materials disposed along the longitudinal and circumferential directions of the conduit; the fused cast refractories constituting the conduit, the monolithic refractory forming the refractory brick layer and the refractory bricks constituting the refractory brick layer are selected such that the refractory layer contains a portion that has a temperature equal to the flow point of the molten glass when the molten glass passes through the conduit.

6 Claims, 3 Drawing Sheets

(56) References Cited

U.S. PATENT DOCUMENTS 7,007,514 B2 * 3/2006 Sakai .................. C03B 5/2252
65/134.2

FOREIGN PATENT DOCUMENTS

| JP | 2000-7346 | 1/2000 |
|----|-----------|--------|
| JP | 2003-128422 | 5/2003 |
| WO | WO 2007/020754 | 2/2007 |
| WO | WO 2009/125750 | 10/2009 |

OTHER PUBLICATIONS

"Mortar/Tamping Materials", Glass Yokairo-yo Futeikei Taikabutsu, AGC Ceramics Co., Ltd., Jun. 20, 2014, URL:http://www.agcc.jp/2005/databank/01_02_04.html.

AGC Ceramics Co., Ltd., "Glass Engineering", p. 22, Japan, 2010.

* cited by examiner

MOLTEN GLASS CONDUIT STRUCTURE, AND DEVICE AND METHOD USING CONDUIT STRUCTURE

TECHNICAL FIELD

The present invention relates to a conduit structure for molten glass. The conduit structure for molten glass according to the present invention is applicable to a conduit for molten glass in a glass producing apparatus and is more specifically applicable to the uprising pipe, the vacuum degassing vessel or the downfalling pipe of a vacuum degassing apparatus for example. The conduit structure for molten glass according to the present invention is especially suited to the uprising pipe, the vacuum degassing vessel or the downfalling pipe of a vacuum degassing apparatus.

The present invention also relates to a vacuum degassing apparatus applying the conduit structure to a conduit for molten glass, in particular, an uprising pipe, a vacuum degassing vessel or a downfalling pipe, and a vacuum degassing process for molten glass using the vacuum degassing apparatus.

The present invention also relates to a process for producing glass wherein the conduit structure is applied to at least a portion of a conduit for molten glass.

The present invention also relates to a glass melting furnace where a glass basis material is molten, and the molten glass is homogenized and refined.

BACKGROUND ART

In a glass producing apparatus, such as a vacuum degassing apparatus, refractory bricks are used as the constituent material for a conduit for molten glass made of a hollow pipe in some cases. As the refractory bricks, fused cast refractories have been normally used because of being excellent in heat resistance and corrosion resistance to molten glass.

When fused cast refractories are used to fabricate a conduit for molten glass, it is, however, impossible to fabricate the conduit as an undivided hollow pipe having no joints. For this reason, a plurality of fused cast refractories, which are formed in a doughnut shape having an opening in a central portion, are prepared and stacked one another to fabricate a hollow pipe, for example. With regard to such fused cast refractories formed in a doughnut shape, even in cases where fused cast refractories formed in a doughnut shape having no joints are used, it is usual that a plurality of fused cast refractories, which are formed in a substantially fan-shape or wedge shape, are prepared, and these fused cast refractories are assembled to one another along their circumferential direction to be formed in a doughnut shape.

This leads to that when using fused cast refractories to fabricate a conduit for molten glass, joints inevitably exist between adjacent fused cast refractories on the inner side of the hollow pipe, i.e. a flow path in direct contact with molten glass. It is considered that fused cast refractories are less susceptible to the oozing-out of molten glass from joints in comparison with fired bricks because of having a dense composition with a low porosity. It is, however, difficult to completely prevent molten glass from oozing out of a joint.

As one proposal, it is considered that a joint material is embedded into each of the joints between adjacent fused cast refractories forming a flow path in direct contact with molten glass. The joint material in direct contact with molten glass is, however, likely to be corroded by molten glass in comparison with the fused cast refractories because the joint material usually has a poor density in comparison with fused cast refractories. This has caused a problem in that although fused cast refractories are less susceptible to corrosion, the joints between adjacent fused cast refractories are more intensively corroded. Although it is possible to delay the oozing-out of molten glass from joints in comparison with a case where no joints are buried, molten glass oozes out of joints when the joints have been corroded.

A conduit for molten glass is equipped with a backup (supporting structure) therearound. The backup is helpful to press the conduit toward the center thereof such that the joints between adjacent fused cast refractories assembled together in a doughnut shape are brought into close contact with the adjacent fused cast refractories. Further, the backup has a thermal insulating and reinforcing function for the conduit.

As the backup, refractory bricks and solid thermal insulating materials are usually used. As the refractory bricks, fired bricks are normally used in terms of cost. There are various kinds of fired bricks. Selection is made to use fired bricks having a desired property according to required functions. Among them, fired bricks that are excellent in corrosion resistance to molten glass are preferably used. In order to perform a thermal insulating and heat retaining function among the functions required to the backup, solid thermal insulating materials are preferably used.

Although the solid thermal insulating materials are satisfactory in terms of thermal insulating and heat retaining capacity, the solid thermal insulating materials are poor in corrosion resistance to molten glass in comparison with the fused cast refractories and fired bricks having an excellent corrosion resistance to molten glass among the fired bricks. For this reason, there is a risk that refractory bricks serving as the solid thermal insulating materials are significantly corroded by molten glass when the molten glass, which oozes out of joints between adjacent fused cast refractories constituting a conduit, has arrived at the solid thermal insulating materials constituting the backup. When solid thermal insulating materials constituting the backup are corroded, the vacuum degassing apparatus itself could have a shortened service life.

Patent Document 1 listed below discloses a conduit structure for molten glass which has a flow path formed in a polygonal shape in section, has joints disposed at the corners of the flow path with molten glass flowing at a low flow rate therein, and has cooling pipes disposed on the outer ends of the joints in order that the joints between adjacent refractory bricks, which are brought into direct contact with the molten glass, are prevented from being corroded to avoid the oozing-out of the molten glass from the joints.

In the proposal disclosed by Patent Document 1, the conduit structure is, however, necessarily complicated because it is necessary to dispose a cooling means, such as a cooling pipe, on each of the outer ends of the joints between adjacent refractory bricks. If water oozes out of a cooling pipe, there is a risk that refractory bricks are cracked by heat shock. There is also a risk that oozing cooling water contaminates the surroundings. Patent Document 1 discloses that unit bricks with a joint formed therebetween are provided at opposite ends with projections extending in an outer direction to extend the joints radially from the center of a flow path formed by the unit bricks in order to extend the length of the joints without increasing the thickness of the refractory bricks. When such projections are provided on the refractory bricks, there is, however, a risk that bricks are cracked because the temperature differences between an outer portion and an inner portion of each of the bricks is increased.

In order to solve the above-mentioned problems involved in the proposal disclosed in Patent Document 1, the inventors have disclosed, in Patent Document 2 listed below, a conduit structure for molten glass wherein refractory bricks are prevented from being cracked, without using a cooling means, such that the solid thermal insulating materials constituting the backup for a conduit are prevented from being corroded by molten glass oozing out of a joint between adjacent fused cast refractories constituting the conduit.

The conduit structure for molten glass disclosed by Patent Document 2 is characterized to be a conduit structure for molten glass wherein a conduit is constituted by fused cast refractories assembled together in a longitudinal and circumferential directions, and a backup disposed around the conduit, wherein the backup is constituted by a refractory layer disposed at an outer side of the conduit and a thermal insulating material layer, and wherein the fused cast refractories constituting the conduit and the refractory bricks constituting the refractory brick layer are selected such that the refractory layer contains a portion that has a temperature equal to the flow point of the molten glass when the molten glass passes through the conduit.

In the conduit structure disclosed by Patent Document 2, even when the molten glass oozes out of a joint between adjacent fused cast refractories constituting the conduit, the temperature of the molten glass lowers to a level of not higher than the flow point of the molten glass while the oozing-out molten glass is passing through the refractory brick layer. By this arrangement, there is no risk that the molten glass oozing out of a joint between adjacent fused cast refractories arrives at the thermal insulating material layer located at an outer position than the refractory brick layer. Thus, the solid thermal insulating materials constituting the backup can be prevented from being corroded by the molten glass that has oozed out of a joint between adjacent fused cast refractories.

The conduit structure disclosed by Patent Document 2 needs no cooling means, such as a cooling pipe, which contributes to prevent molten glass from oozing out. For this reason, the conduit structure does not need to be complicated. Further, there is no risk that water leakage out of the cooling pipe causes refractory bricks to be cracked, or that oozing cooling water contaminates the surroundings.

Furthermore, also in a glass melting furnace for melting a raw glass material and homogenizing and refining the molten glass, fused cast refractories are usually used as the refractory bricks disposed at a position in direct contact with the molten glass.

The glass melting furnace is required to have a thermal insulation structure in some cases. For example, when a dam wall is disposed so as to project from the bottom of a melting furnace forming a flow path for molten glass as in the glass melting furnace disclosed by Patent Document 3, the glass melting furnace is required to have an thermal insulation structure in order to control the corrosion of the dam wall by the molten glass. When a glass melting furnace is configured to have a thermal insulation structure, fired bricks are disposed as the refractory bricks outside the fused cast refractories, and solid thermal insulating materials are disposed outside the fired bricks in the same way as the above-mentioned conduit structure for molten glass.

The glass melting furnace thus configured involves a similar problem to the above-mentioned conduit structure for molten glass.

PRIOR ART DOCUMENTS

Patent Documents

Patent Document 1: JP-A-2003-128422
Patent Document 2: WO2007/020754
Patent Document 3: WO2009/125750

DISCLOSURE OF INVENTION

Technical Problem

In the conduit structure disclosed in Patent Document 2, the selection of the fused cast refractories constituting the conduit and the refractory bricks constituting the refractory brick layer specifically means to make selections with regard to the following items:
  The kinds of the fused cast refractories and the refractory bricks
  The thicknesses of the fused cast refractories and the refractory bricks in a radial direction of a conduit.
  The stacking number in the fused cast refractory layer and the refractory brick layer along the radial direction of the conduit.

To this regard, by making a selection of only the kinds of the fused cast refractories and the refractory bricks, it is difficult to obtain a situation where the refractory material layer contains a portion that has a temperature equal to the flow point of the molten glass. In order to obtain this situation, it is necessary to make a selection of at least one of the latter two items as well. For this reason, the thicknesses of the fused cast refractory layer and the refractory brick layer constituting the conduit increase.

Because the fused cast refractories constituting a conduit and the refractory bricks constituting the refractory brick layer are expensive, it is, however, desired, in terms of production cost reduction of the conduit structure, to reduce the used amount of them, specifically to reduce the thicknesses of the fused cast refractory layer and the refractory brick layer constituting the conduit structure. Further, it is expected that a reduction in the thicknesses of the fused cast refractory layer and the refractory brick layer constituting the conduit structure also contributes to a reduction in the weight, an increase in earthquake-resistant strength and a size reduction of the conduit structure.

In order to solve the problems involved in the above-mentioned prior art, it is an object of the present invention to provide a conduit structure for molten glass, which prevents fused cast refractories from being cracked, without using a cooling means, such that solid thermal insulating materials constituting a backup for a conduit are prevented from being corroded by molten glass oozing out of a joint between adjacent fused cast refractories constituting the conduit, and which reduce production cost.

The conduit structure for molten glass according to the present invention is preferably applied to the uprising pipe, the vacuum degassing vessel or the downfalling pipe of a vacuum degassing apparatus.

It is another object of the present invention to provide a vacuum degassing apparatus applying the conduit structure to a conduit for molten glass, in particular, an uprising pipe, a vacuum degassing vessel or a downfalling pipe, and a vacuum degassing process for molten glass using the vacuum degassing apparatus.

It is a further object of the present invention to provide a glass melting furnace which prevents fused cast refractories from being cracked, without using a cooling means, such that solid thermal insulating materials constituting a backup for a conduit are prevented from being corroded by molten glass oozing out of a joint between adjacent fused cast refractories constituting the conduit, and which reduces production cost.

Solution to Problem

In order to attain the above-mentioned objects, the present invention provides a conduit structure for molten glass, including a conduit and a backup disposed around the conduit;

the conduit being a hollow pipe made of fused cast refractories disposed in longitudinal and circumferential directions thereof;

the backup being constituted by a refractory layer outside the conduit, and a thermal insulating material layer disposed outside the refractory layer;

the refractory layer including a refractory brick layer made of refractory bricks disposed along the longitudinal and circumferential directions of the conduit, and a monolithic refractory layer formed by placing a monolithic refractory containing from 30 to 100% of $Al_2O_3$ and from 0 to 70% of $SiO_2$ in percent by mass on an oxide basis and sintering the monolithic refractory;

the thermal insulating material layer including a solid thermal insulating material layer made by disposing solid thermal insulating materials along the longitudinal and circumferential directions of the conduit;

the fused cast refractories constituting the conduit, the monolithic refractory constituting the refractory brick layer and the refractory bricks constituting the refractory brick layer are selected such that the refractory layer contains a portion that has a temperature equal to the flow point of the molten glass when the molten glass passes through the conduit (hereinbelow, referred to as "the conduit structure according to the present invention").

The present invention also provides a conduit structure for molten glass, including a conduit and a backup disposed around the conduit;

the conduit being a hollow pipe made of fused cast refractories disposed in longitudinal and circumferential directions thereof;

the backup being constituted by a refractory layer outside the conduit, and a thermal insulating material layer disposed outside the refractory layer;

the refractory layer including at least a monolithic refractory layer formed by placing, along the longitudinal and circumferential directions of the conduit, a monolithic refractory containing from 30 to 100% of $Al_2O_3$ and from 0 to 70% of $SiO_2$ in percent by mass on an oxide basis and sintering the monolithic refractory;

the thermal insulating material layer containing a solid thermal insulating material layer made by disposing solid thermal insulating materials along the longitudinal and circumferential directions of the conduit;

the fused cast refractories constituting the conduit, the monolithic refractory constituting the refractory brick layer and the refractory bricks constituting the refractory brick layer are selected such that the thermal insulating material layer contains a portion that has a temperature equal to the flow point of the molten glass when the molten glass passes through the conduit.

In the conduit structure according to the present invention, the refractory layer may have at least two refractory brick layers, and a second monolithic refractory layer, which is formed by placing a monolithic refractory containing from 30 to 100% of $Al_2O_3$ and from 0 to 70% of $SiO_2$ in percent by mass on an oxide basis and sintering the monolithic refractory, may be further disposed between the refractory brick layers.

In the conduit structure according to the present invention, it is preferred that the monolithic refractory have a total content of $Al_2O_3$ and $SiO_2$ ($Al_2O_3+SiO_2$) of at least 60%.

In the conduit structure according to the present invention, it is preferred that the monolithic refractory have a compressive strength of from 30 to 200 MPa.

In the conduit structure according to the present invention, it is preferred that the monolithic refractory be at least one kind selected from the group consisting of a castable refractory, a plastic refractory and a ramming material.

In the conduit structure according to the present invention, it is preferred that each of the refractory bricks be at least one kind selected from the group consisting of a dense alumina-based brick, a dense alumina/silica-based brick, a dense silica-based brick, a dense zirconia-based brick, a dense zirconia/silica-based brick, a dense zirconia/alumina-based brick, a dense alumina/zirconia/silica-based brick, a dense alumina/magnesia-based brick and a dense zirconia/magnesia-based brick.

In the conduit structure according to the present invention, it is preferred that the monolithic refractory layer have a total thickness of from 1 to 500 mm in a radial direction thereof.

In the conduit structure according to the present invention, it is preferred that the fused cast refractories have a total thickness of from 5 to 1,000 mm in a radial direction of the conduit.

In the conduit structure according to the present invention, it is preferred that the refractory layer have a total thickness of from 6 to 1,500 mm in a radial direction thereof.

In the conduit structure according to the present invention, it is preferred that the refractory brick layer have a total thickness of from 5 to 1,000 mm in a radial direction thereof.

It is preferred that the conduit structure according to the present invention be configured such that the conduit structure for molten glass has a total thickness of from 15 to 3,000 mm in a radial direction thereof.

It is preferred that the conduit structure for molten glass according to the present invention be applied to as at least one of an uprising pipe, a vacuum degassing vessel and a downfalling pipe of a vacuum degassing apparatus including the uprising pipe, the vacuum degassing vessel and the downfalling pipe.

The present invention also provides a vacuum degassing apparatus, which includes a conduit for molten glass having the conduit structure according to the present invention.

The present invention also provides a process for vacuum-degassing molten glass by use of a vacuum degassing apparatus including an uprising pipe, a vacuum degassing vessel and a downfalling pipe, wherein at least one of the uprising pipe, the vacuum degassing vessel and the downfalling pipe has the conduit structure according to the present invention.

The present invention also provides a process for producing glass by use of a glass producing apparatus with the conduit structure according to the present invention being applied to at least a portion of a conduit for molten glass, wherein molten glass that passes through the conduit structure according to the present invention has a temperature of from 1,000 to 1,500° C.

In the process for producing glass according to the present invention, it is preferred that the molten glass have a glass base composition of from 65 to 75% of $SiO_2$, from 0 to 5% of $Al_2O_3$, from 0 to 15% of CaO, from 0 to 15% of MgO, from 10 to 20% of $Na_2O$, and from 0 to 3% of $K_2O$ in percent by mass on an oxide basis.

The present invention also provides a glass melting furnace including fused cast refractories disposed to form a bottom thereof, and a backup disposed outside the fused cast refractories forming the bottom, the backup being constituted by a refractory layer disposed outside the fused cast refractories and a thermal insulating material layer disposed outside the refractory layer;

the refractory layer including a refractory brick layer made by disposing refractory bricks outside the fused cast refractories forming the bottom, and a monolithic refractory layer disposed between the refractory brick layer and the fused cast refractories forming the bottom, the monolithic refractory layer being formed by placing a monolithic refractory containing from 30 to 100% of $Al_2O_3$ and from 0 to 70% of $SiO_2$ in percent by mass on an oxide basis and sintering the monolithic refractory;

the thermal insulating material layer containing a solid thermal insulating material layer made of solid thermal insulating materials disposed along outside the refractory bricks; and the fused cast refractories, the monolithic refractory constituting the monolithic refractory layer and the refractory bricks constituting the refractory brick layer being selected such that the thermal insulating material layer contains a portion that has a temperature equal to the flow point of the molten glass when a raw glass material is molten.

Advantageous Effects of Invention

The conduit structure according to the present invention can dispense with a cooling means, such as a cooling pipe, for the purpose of controlling molten glass so as not to ooze out. This arrangement prevents the conduit structure from being complicated. Further, there is no risk that water leaks out of the cooling pipe to break refractory bricks or oozing cooling water contaminates the surroundings.

The arrangement that the thermal insulating material layer contains a portion that has a temperature equal to the flow point of molten glass when the molten glass passes through the conduit, is helpful to reduce the used amount of the fused cast refractories constituting the conduit and the refractory bricks constituting the refractory brick layer in comparison with the conduit structure disclosed in Patent Document 2 wherein the refractory layer contains a portion that has a temperature equal to the flow point of molten glass when the molten glass passes through the conduit. Thus, the production cost of the conduit structure is reduced.

In the conduit structure according to the present invention, when a portion of molten glass that has oozed out of a joint between adjacent fused cast refractories reaches the monolithic refractory layer, that portion of the molten glass is made heterogeneous to have a significantly increased viscosity. For this reason, the molten glass is controlled so as not to further ooze out into the refractory brick layer disposed outside the monolithic refractory layer. Thus, the molten glass is controlled so as not to ooze out into thermal insulating materials disposed outside the refractory brick layer. The conduit structure according to the present invention has no joints in the monolithic refractory layer which is formed by placing the monolithic refractory in between the fused cast refractories and the thermal insulating material and sintering the monolithic refractory, with the result that the conduit structure has an advantage of effectively avoiding a case where molten glass that has oozed out of a joint between adjacent fused cast refractories constituting a conduit oozes out into the thermal insulating material layer.

It should be noted that in a case where the molten glass can be prevented from oozing outside from the monolithic refractory layer, the monolithic refractory layer may be disposed outside the refractory brick layer, or the refractory layer may be made of only the monolithic refractory layer.

In the vacuum degassing apparatus according to the present invention, the solid thermal insulating materials constituting the backup are prevented from being corroded by molten glass that has oozed out of a joint between adjacent fused cast refractories constituting a conduit. Thus, it is possible to drastically prolong the service life of the apparatus.

DESCRIPTION OF EMBODIMENTS

Figure 1:
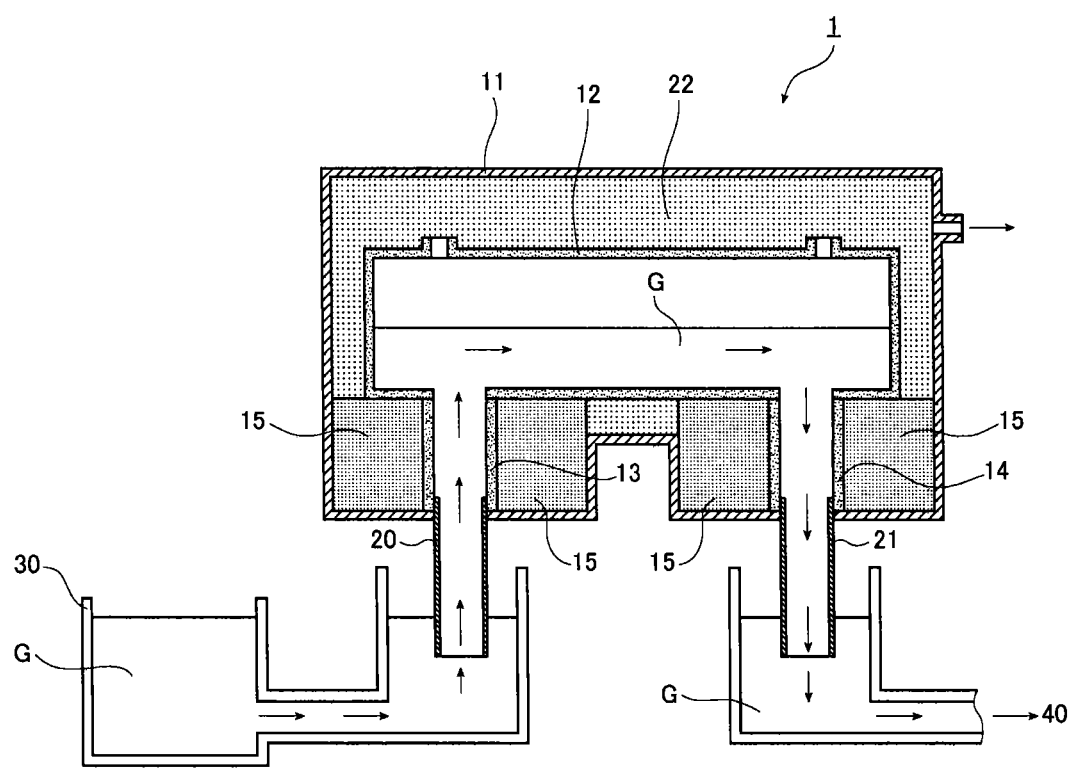
FIG. 1 is a cross-sectional view of a vacuum degassing apparatus including a conduit structure according to the present invention.

Now, the present invention will be described in reference to the accompanying drawings. The vacuum degassing apparatus 1 shown in FIG. 1 is used in a process where molten glass G in a melting tank 30 is vacuum-degassed and is continuously fed to s subsequent treatment bath 40. The vacuum degassing apparatus 1 includes a vacuum housing 11 which is kept in a depressurized state during operation. The vacuum housing 11 has a vacuum degassing vessel 12 housed therein so as to have a longitudinal axis thereof extending in a horizontal direction. The vacuum degassing vessel 12 has an uprising pipe 13 mounted to a lower side of one end thereof so as to vertically extend and a downfalling pipe 14 mounted to a lower side of the other end thereof.

In the vacuum degassing apparatus 1, each of the vacuum degassing vessel 12, the uprising pipe 13 and the downfalling pipe 14 is a hollow pipe made of fused cast refractories and having a rectangular contour in section for example. The uprising pipe 13 and the downfalling pipe 14 have lower ends provided with extension pipes 20 and 21 made of platinum or a platinum alloy. In the vacuum housing 11, each of the uprising pipe 13 and the downfalling pipe 14 has a backup 15 disposed therearound.

The vacuum degassing vessel 12 has thermal insulating materials 22 disposed therearound.

In the vacuum degassing apparatus 1 shown in FIG. 1, each of a structure including the uprising pipe 13 and the backup 15 and a structure including the downfalling pipe 14 and the backup 15 is constituted as the conduit structure according to the present invention.

Although explanation of FIGS. 2 and 3 will be made about a case where the conduit structure according to the present invention is applied to the uprising pipe 13 of the vacuum degassing apparatus 1, the explanation of the uprising pipe 13 is also applicable to the downfalling pipe 14 and is also basically applicable to the vacuum degassing vessel 12.

The uprising pipe 13 is a hollow pipe having a rectangular contour in section, which has a hollow portion formed in a circular shape in section as a flow path for molten glass. The uprising pipe 13 is constituted by stacking fused cast refractories 13a. As shown in FIG. 3, paired fused cast refractories 13a, each of which has a rectangular shape in section and a semi-circular notch formed therein, are a combined to form a hollow pipe structure having a rectangular shape in section and a hollow portion formed in a circular shape in section. The uprising pipe 13 is constituted by stacking such hollow pipe structures.

The extension pipe 20 has a fixing flange 20a formed on an upper end thereof and inserted into between fused cast refractories 13a forming a portion of the uprising pipe 13 close to a lower end. The extension pipe 20 is made of platinum or a platinum alloy and has a cylindrical body formed in a circular shape in section. The uprising pipe has a lower end portion (i.e. a lower opening portion of the vacuum housing 11) sealed by a sealing flange 20b, which is formed on a portion of the extension pipe 20 close to the upper end.

There is no limitation to the kind of the fused cast refractories 13a constituting the uprising pipe 13. Known fused cast refractories, which are used as a constituent material for a furnace or a conduit for molten glass, or commercially available fused cast refractories may be properly selected. Specifically, the fused cast refractories may be preferably at least one kind selected from a group consisting of alumina-based fused cast refractories, such as $\alpha$-alumina-based fused cast refractories, $\alpha,\beta$-alumina-based fused cast refractories and $\beta$-alumina-based fused cast refractories, zirconia-based fused cast refractories and alumina/zirconia/silica (AZS)-based fused cast refractories.

Figure 2:
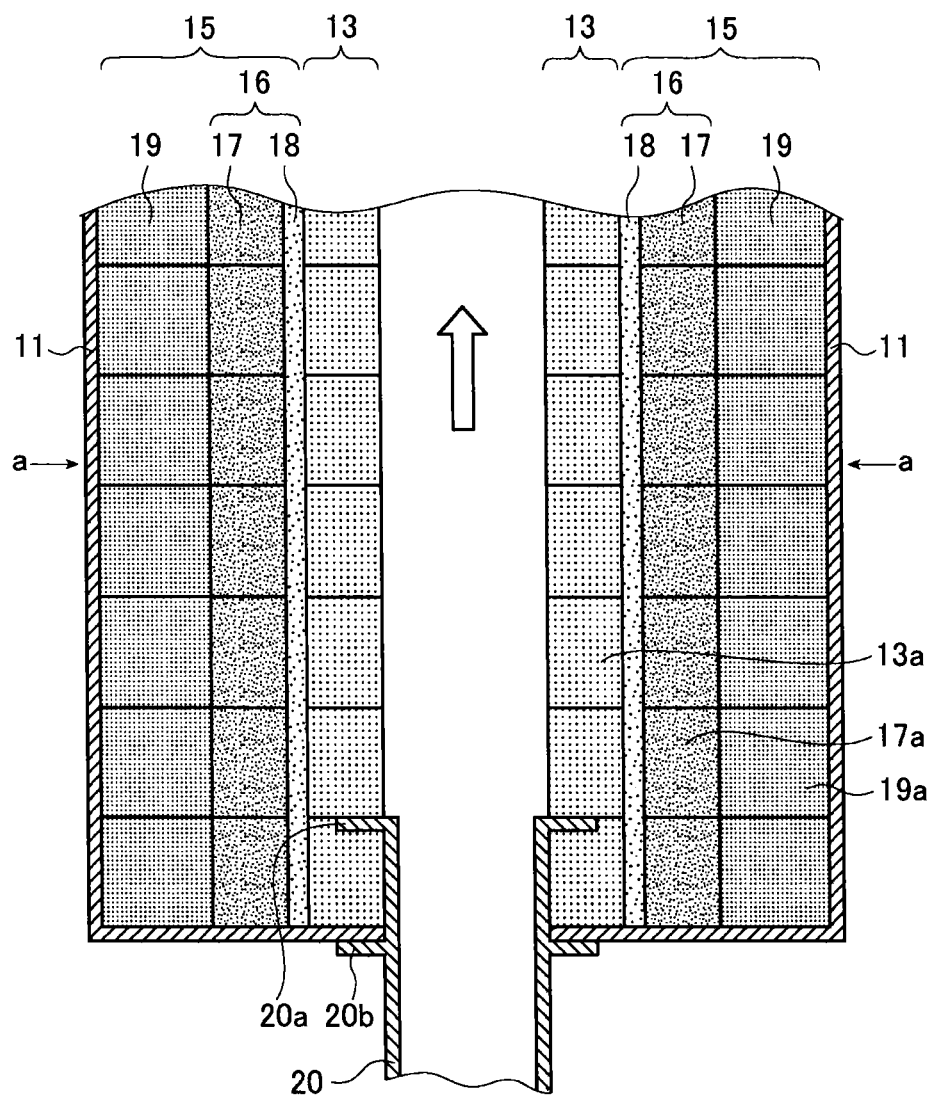
FIG. 2 is an enlarged view showing a portion of the conduit structure shown in FIG. 1, which contains an uprising pipe 13 and a backup 15.
Figure 3:
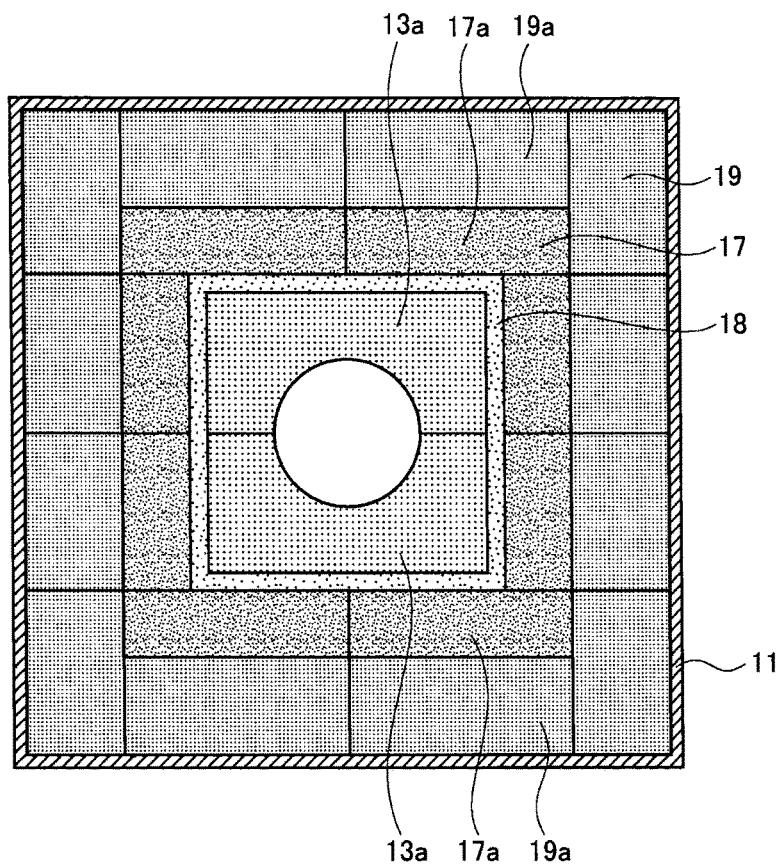
FIG. 3 is a cross-sectional view taken along line a-a of FIG. 2.

As shown in FIGS. 2 and 3, the backup 15 is constituted by a refractory layer 16 disposed outside the uprising pipe 13 and a thermal insulating material layer 19 disposed outside the refractory layer 16. In FIGS. 2 and 3, the refractory layer 16 is constituted by a refractory brick layer 17 formed by disposing refractory bricks 17a along a longitudinal direction and a circumferential direction of the uprising pipe 13, and a monolithic refractory layer 18 disposed between the uprising pipe 13 and the refractory brick layer 17. On the other hand, the thermal insulating material layer 19 is a solid thermal insulating material layer which is made of solid thermal insulating materials 19a disposed along the longitudinal direction and the circumferential direction of the uprising pipe 13.

Because the refractory brick layer 17 is a component of the refractory layer 16 disposed between the uprising pipe 13 and the thermal insulating material layer 19, the refractory bricks 17a used in the refractory brick layer 17 need to be excellent in heat resistance and corrosion resistance to molten glass. For this purpose, fire bricks that are excellent in corrosion resistance to molten glass (hereinbelow, referred to as "dense fired bricks") are used as the refractory bricks 17a. In Description, the dense fired bricks mean fired bricks that have any one of the following characteristics:

Bulk specific gravity (JIS R2205 (1993)): beyond 1.0
Thermal conductivity (1,000° C.): beyond 0.3 (W/mK)
Apparent porosity (JIS R2205 (1993); less than 60%

The dense fired bricks used as the refractory bricks 17a preferably have all of the above-mentioned three characteristics.

With regard to the specific examples of the dense fired bricks, each of the fired bricks is preferably at least one kind selected from a group consisting of a dense alumina-based fired brick, a dense alumina/silica-based fired brick, a dense silica-based fired brick, a dense zirconia-based fired brick, a dense zirconia/silica-based fired brick, a dense zirconia/alumina-based fired brick, a dense alumina/zirconia/silica-based fired brick, a dense alumina/magnesia-based fired brick and a dense zirconia/magnesia-based fired brick.

The monolithic refractory layer 18 is formed by filling a monolithic refractory in between the fused cast bricks 13a constituting the uprising pipe 13 and the refractory bricks 17a constituting the refractory brick layer 17 and sintering the monolithic refractory. Specifically, the optimum method is to fill a monolithic refractory in between the fused cast refractories 13a constituting the uprising pipe 13 and the refractory bricks 17a constituting the refractory brick layer 17, although it is also acceptable to form the monolithic refractory layer by applying a monolithic refractory to the surfaces of the fused cast bricks 13a constituting the uprising pipe 13 by spraying or troweling, and sintering the monolithic refractory.

Thus, the monolithic refractory layer 18 is made as a sintered body without any joints, which is different from the uprising pipe 13 made by disposing the fused cast refractories 13a and the refractory brick layer 17 made by disposing the refractory bricks 17a. This arrangement is appropriate to avoid a risk that molten glass that has oozed out of a joint between adjacent fused cast refractories 13a oozes out further outward.

When molten glass that has oozed out of a joint between adjacent fused cast refractories reaches the monolithic refractory layer 18, the monolithic refractory layer 18 according to the present invention make that portion of the molten glass heterogeneous to provide that portion with a higher viscosity.

Thus, even if molten glass has oozed out of a joint between adjacent fused cast refractories 13a constituting the conduit, the oozing portion of the molten glass is controlled so as not to ooze out into the refractory brick layer 17 disposed outside the monolithic refractory layer 18. Further, even if the molten glass oozes out into the refractory brick layer 17 with a further higher viscosity while passing the refractory brick layer 17, oozing stops within the refractory brick layer 17. As a result, there is no risk that the molten glass reaches the thermal insulating material layer 19 disposed outside the refractory brick layer 17.

If molten glass is made highly viscous in the monolithic refractory layer to be prevented from oozing out into the thermal insulating material layer positioned outside of the monolithic refractory layer, the order of the refractory brick layer and the monolithic refractory layer may be switched, or the refractory layer may be constituted by only the monolithic refractory layer.

It is be noted that making molten glass heterogeneous in Description means a phenomenon that the viscosity of molten glass is increased by a change in glass composition or glass structure.

With regard to making molten glass heterogeneous in Description, T log $\eta$=2 (temperature at which the viscosity is $10^2$ poise, unit: ° C.) and T log $\eta$=4 (temperature at which the viscosity is $10^4$ poise, unit: ° C.), which are temperatures used as indices indicative of the high viscosity of glass, may be employed as references. Before and after molten glass is made heterogeneous, temperature $T_2$ and temperature $T_4$ increase by preferably at least 150° C., more preferably at least 200° C. and further preferably at least 250° C.

Molten glass is made heterogeneous to form a heterogeneous layer in a portion of the monolithic refractory layer 18 in contact with the molten glass. Even if a crack is formed in the monolithic refractory layer 18 during use of the conduit structure according to the present invention, the crack is clogged by formation of such a heterogeneous layer. Thus, molten glass that has oozed out of a joint between fused cast refractories 13a can be prevented from oozing out further outward.

From this viewpoint, the monolithic refractory used in the monolithic refractory layer 18 is required to have a composition that is capable of making the molten glass heterogeneous to increase the viscosity.

For this reason, in the conduit structure according to the present invention, the monolithic refractory contains from 30 to 100% of $Al_2O_3$ and from 0 to 70% of $SiO_2$ in percent by mass on an oxide basis. The composition of the monolithic refractory defined herein indicates the composition of the monolithic refractory layer that is formed by placing the monolithic refractory and sintering the monolithic refractory. This explanation is also applicable to the explanation below.

Because these components are glass network formers, the components can make molten glass heterogeneous to increase its viscosity when being brought into contact with the molten glass. When the molten glass is soda lime-based glass, the presence of $Al_2O_3$ exhibits a highly significant effects.

When the content of $Al_2O_3$ is lower than 30%, the molten glass is made to be heterogeneous in an insufficient manner, being accompanied by an insufficient raise in the viscosity, at the time of contact with the molten glass. The content of $Al_2O_3$ is preferably at least 50%, more preferably at least 70%. When the content of $Al_2O_3$ is in one of these ranges, the molten glass that has been made to be heterogeneous is likely to have a high viscosity.

The monolithic refractory used in the monolithic refractory layer has a total content of $Al_2O_3$ and $SiO_2$ ($Al_2O_3$+$SiO_2$) of preferably at least 60%, more preferably at least 80%, further more preferably 90%.

There is no limitation to the kind of the monolithic refractory used in the monolithic refractory layer 18 as long as the monolithic refractory has a composition as defined above. The monolithic refractory may be at least one kind selected from a group consisting of a castable refractory, a plastic refractory and a ramming material. In other words, the monolithic refractory may contain a combination of two kinds among them.

The ramming material forming the monolithic refractory may be specifically a commercially available tamp material containing alumina as a main component. Specific examples of the castable refractory include a semi-zircon-based monolithic refractory, a high-alumina-based casting material and a high-alumina-based sealing material.

The monolithic refractory layer 18 has a compressive strength of preferably from 30 to 200 MPa. The relevant compressive stress indicates the numerical value of the sintered monolithic refractory.

The thermal insulating material layer 19 (i.e. solid thermal insulating material layer) mainly perform a thermal insulating and heat retaining function for the uprising pipe 13 among the functions of the backup 15. For this reason, the thermal insulating material layer 19 (solid thermal insulating material layer) is made of solid thermal insulating materials 19a having an excellent thermal insulating and heat retaining capability. In Description, the solid thermal insulating materials mean solid thermal insulating materials that have any one of the following characteristics:
Bulk specific gravity (JIS R2205 (1993)): at most 1.0
Thermal conductivity (1,000° C.): at most 0.3 (W/mK)
Apparent porosity (JIS R2205 (1993); at least 60%

Examples of the solid thermal insulating materials that satisfy at least one of the above-mentioned characteristics include commercially available bricks and insulating boards, such as "Microtherm" molded products (product name, manufactured by Microtherm NV) and "Isowool" boards (product name, manufactured by Isolite Insulation Products Co., Ltd.).

The solid thermal insulating materials 19 used in the thermal insulating material layer 19 preferably have all of the above-mentioned three characteristics.

In FIGS. 2 and 3, when the uprising pipe 13 is seen in a radial direction thereof, the fused cast refractories 13a constituting the uprising pipe 13 are placed in one layer, the refractory bricks 17a (constituting the refractory brick layer) are placed as the refractory brick layer 17 in one layer, the solid thermal insulating materials 19a (constituting the solid thermal insulating material layer) are placed as the thermal insulating material layer 19 in one layer, and the monolithic refractory layer 18 is placed between the fused cast refractories 13a constituting the uprising pipe 13 and the refractory bricks 17a constituting the refractory brick layer 17. It is sufficient that the monolithic refractory layer is placed in the refractory layer. The fused cast refractories, the refractory bricks, the monolithic refractory and the solid thermal insulating materials may be placed in this order. These figures merely show the positional relationship among the fused cast refractories 13a constituting the uprising pipe 13, the monolithic refractory layer 18, the refractory bricks 17a constituting the refractory brick layer 17, and the solid thermal insulating materials 19a constituting the thermal insulating material layer 19 (solid thermal insulating material layer). These figures do not necessarily mean that the fused cast refractories 13a, the refractory bricks 17a and the solid thermal insulating materials 19a (the solid thermal insulating material layer) are placed in one layer, respectively. For example, it is sufficient that the monolithic refractory layer is placed in the refractory layer. The fused cast refractories, the refractory bricks, the monolithic refractory and the solid thermal insulating materials may be placed in this order, or the fused cast refractories, the refractory bricks, the monolithic refractory, the refractory bricks, the monolithic refractory and the solid thermal insulating materials may be placed in this order.

When the uprising pipe 13 of the vacuum degassing apparatus is fabricated by use of the fused cast refractories, the fused cast refractories may be made of a plurality of fused cast refractories 13a having a common composition or different compositions. When a plurality of fused cast refractories 13a are used, these fused cast refractories are placed so as to have at least two layers along the radial direction of the uprising pipe 13.

With regard to the refractory brick layer 17, it is preferred that a plurality of refractory bricks 17a having a common composition or different compositions be used so as to be placed in at least two layers along the radial direction of the uprising pipe 13. In Description, to place the refractory bricks 17a in at least two layers along the radial direction (i.e. sectional direction) of the uprising pipe 13 will be expressed as reciting that "the refractory brick layers 17 are placed in at least two layers".

When the refractory brick layers 17 are placed in at least two layers, a second monolithic refractory layer may be further placed between adjacent refractory brick layers having at least two layers. In this case, the physical properties of the monolithic refractory layer and the monolithic refractory used therein are already described above. When the refractory brick layers 17 are placed in at least three layers, at least two layers of such second monolithic refractory layers may be placed.

With regard to the thermal insulating material layer 19, it is preferred that a plurality of solid thermal insulating materials 19a having a common composition or different compositions be used so as to be placed in at least two layers along the radial direction of the uprising pipe 13. In Description, to place the solid thermal insulating materials 19a in at least two layers along the radial direction of the uprising pipe 13 will be expressed as reciting that "the thermal insulating material layer 19 includes at least two layers of solid thermal insulating material layers".

In the conduit structure for molten glass according to the present invention, the fused cast refractories constituting the conduit, the monolithic refractory constituting the refractory brick layer and the refractory bricks constituting the refractory brick layer are selected such that the thermal insulating material layer contains a portion that has a temperature equal to the flow point of the molten glass when the molten glass passes through the conduit.

The flow point of glass is a temperature at which a glass viscosity $\eta$ satisfies the formula of log $\eta$ (pores)=5, and which is indicative of glass deformation, and which is also called Lillie Point. The formula of 1 pores=0.1 Pa·s=0.1 kg/m·s is established. The flow point of glass varies on the kinds of glass. For example, the flow point is about from 900 to 1,200° C. for alkali-free glass and about from 850 to 1,150° C. for soda lime glass.

In the conduit structure disclosed in Patent Document 2, in order that the flow of the molten glass that has oozed out of a joint between adjacent fused cast refractories stops in the refractory layer, the fused cast refractories constituting the conduit and the refractory bricks constituting the refractory brick layer are selected such that the refractory layer contains a portion that has a temperature equal to the flow point of the molten glass when the molten glass passes through the conduit. On the other hand, in accordance with the present invention, as described above, molten glass is brought into contact with the monolithic refractory layer to be made heterogeneous and highly viscous and stops flowing in the refractory brick layer with the result that the fused cast refractories constituting the conduit, the monolithic refractory constituting the refractory brick layer and the refractory bricks constituting the refractory brick layer are selected such that the refractory layer contains a portion that has a temperature equal to the flow point of glass. Thus, it is possible to reduce the used amount of the fused cast refractories constituting the conduit and the refractory bricks constituting the refractory brick layer in comparison with the conduit structure disclosed in Patent Document 2.

When this arrangement is explained in reference to FIG. 2, the fused cast refractories 13a constituting the uprising pipe 13, the monolithic refractory constituting the monolithic refractory layer 18 and the refractory bricks 17a constituting the refractory brick layer 17 are selected such that the thermal insulating material layer 19 contains a portion that has a temperature equal to the flow point of the molten glass when the molten glass passes through the uprising pipe 13. More specifically, the fused cast refractories 13a constituting the uprising pipe 13, the monolithic refractory constituting the monolithic refractory layer 18 and the refractory bricks 17a constituting the refractory brick layer 17 are selected, taking the following items into consideration.

The kinds of the fused cast refractories 13a, the monolithic refractory and the refractory bricks 17a

The thicknesses of the fused cast refractories 13a, the monolithic refractory layer 18 and the refractory bricks 17a in the radial direction of the uprising pipe 13

The stacking numbers of the fused cast refractories 13a and the refractory bricks 17a disposed along the radial direction of the uprising pipe 13, and the stacking number in the monolithic refractory layer With regard to the fused cast refractories 13a, the monolithic refractory layer 18 and the refractory bricks 17a, how to take the above-mentioned items into consideration in selection will be explained.

(a) Kind of Bricks

Some of the fused cast refractories have different thermal conductivities because of having different porosities. Fused cast refractories having a higher porosity have a lower thermal conductivity and a higher thermal insulating and heat retaining capacity. From this point of view, in a case where fused cast refractories having a high porosity and a low thermal conductivity are used as the fused cast refractories 13a constituting the uprising pipe 13, the temperature of the molten glass that has passed through the fused cast refractories 13a (in other words, has oozed out) is further lowered in comparison with a case where fused cast refractories having a low porosity and a high thermal conductivity are used, even if the temperature of the molten glass that has not yet passed through the fused cast refractories 13a (in other words, has not yet oozed out) is the same in both cases.

When this arrangement is explained in reference to FIG. 2, portions of the fused cast refractories 13a close to inner wall surfaces, i.e. portions of the fused cast refractories close to the glass path in contact with the molten glass have a temperature equal to the molten glass that has not yet passed through the fused cast refractories 13a. On the other hand, portions of the fused cast refractories 13a close to outer wall surfaces, i.e. portions of the fused cast refractories close to wall surfaces in contact with the monolithic refractory layer 18 have a temperature equal to the molten glass that has passed through the fused cast refractories 13a. When the above-mentioned statements is paraphrased, in a case where fused cast refractories having a high porosity and a low thermal conductivity are used, the temperature of the portions of the fused cast refractories 13a close to the outer wall surfaces can be further lowered in comparison with a case where fused cast refractories having a low porosity and a high thermal conductivity are used, even if the portions of the fused cast refractories 13a close to the inner wall surfaces have the same temperature in both cases. It is natural that a decrease in the temperature of the portions of the fused cast refractories 13a close to the outer wall surface results in a decrease in the temperature of the monolithic refractory layer 18, which is disposed outside the fused cast refractories 13a.

Some of the dense fired bricks used as the refractory bricks 17a also have different thermal conductivities because of having different porosities. When among the dense fired bricks, fired bricks having a high porosity and a low thermal conductivity are used, portions of the refractory bricks 17a close to the outer wall surface have a lower temperature in comparison with a case where dense fired bricks having a low porosity and high thermal conductivity are used, even if the portions of the refractory bricks 17a close to the inner wall surface have the same temperature in both cases.

(b) Kinds of Monolithic Refractory

The monolithic refractory is largely classified into one in the form of powder, one in the form of rammed earth and one in the form of paste, which have different ways to place. The monolithic refractory in the form of powder may be, for example, a castable refractory, which is placed by adding water to it at the time of providing and pouring the water-added one. There is also a castable refractory which is placed by trowelling or vibration. The monolithic refractory in the form of rammed earth may be a plastic refractory or a ramming material which is placed by use of e.g. a rammer. The ramming material is harder than the plastic refractory and has no plastic property. As the material for the monolithic refractory, there are various kinds of materials, such as a high alumina-based one, a silica/alumina-based one, a zircon-based one, and a zirconia-based one. As the monolithic refractory, there are one having a high bulk specific gravity and one having a low bulk specific gravity.

(c) Thicknesses of the Bricks in the Radial Direction of the Uprising Pipe, and the Monolithic Refractory Layer The bricks, such as the fused cast refractories and the dense fired bricks, have a different thermal insulating and heat retaining effects according to the thicknesses of the bricks such that bricks having a greater thickness have a greater thermal insulating and heat retaining effect. From the viewpoint, in a case where the fused cast refractories 13a are made of bricks having a great thickness in the radial direction of the uprising pipe 13, the temperature of the portions of the fused cast refractories 13a close to the outer wall surface is further lowered in comparison with a case where the fused cast refractories are made of bricks having a small thickness in the radial direction of the uprising pipe 13, even if the temperature of the fused cast refractories 13a close to the inner wall surface is the same in both cases. It should be noted that when the fused cast refractories 13a are made of bricks having significantly great thickness in the radial direction of the uprising pipe 13, the bricks might be cracked because the temperature difference between an inner portion and an outer portion of bricks increases. This is also applicable to the monolithic refractory layer 18 and the refractory bricks 17a.

(d) Stacking Number in the Brick Layers and Stacking Number in the Monolithic Refractory Layer Disposed Along the Radial Direction of the Uprising Pipe It is impossible to significantly increase the thickness of the fused cast refractories 13a in the radial direction of the uprising pipe since the fused cast refractories may be cracked by a temperature difference between the inner portion and the outer portion as described above. On the other hand, it is also possible to increase the stacking number of the fused cast refractories 13a disposed along the radial direction of the uprising pipe 13 to have a similar thermal insulating and heat retaining effect to the one obtained by an increase in the thickness of the fused cast refractories. From this point of view, instead of using fused cast refractories having a great thickness in the radial direction of the uprising pipe, a plurality of fused cast refractories 13a having a small thickness in the radial direction of the uprising pipe 13 may be used and disposed in layers along the radial direction of the uprising pipe 13 so as to provide the uprising pipe 13 with substantially a similar thickness effect in the radial direction. This is also applicable to the monolithic refractory layer 18 and the refractory bricks 17a.

When the above-mentioned items (c) and (d) are paraphrased, it can also be said that it is sufficient to select the total thickness of the fused cast refractories and the total thickness of the monolithic refractory layer in the radial direction of uprising pipe 13 such that the thermal insulating material layer 19 contains a portion that has a temperature equal to the flow point of the molten glass when the molten glass passes through the uprising pipe 13.

In other words, when the fused cast refractories 13a are disposed in at least two layers along the radial direction of the uprising pipe 13, it is sufficient that selection is made such that the total thickness of the fused cast refractories in the radial direction of the uprising pipe 13 is a certain thickness. This is also applicable to the monolithic refractory layer. In the case of the monolithic refractory layer, when the second monolithic refractory layer is also disposed, it is sufficient that selection is made such that the total thickness of these monolithic refractory layers is a certain thickness. This is also applicable to the refractory bricks 17a. In the case of the refractory bricks, when the refractory bricks 17a are disposed in at least two layers, it is sufficient that selection is made such that the total thickness of these refractory bricks is a certain thickness.

With regard to the fused cast refractories 13a constituting the uprising pipe 13, the total thickness of the fused cast refractories in the radial direction of the uprising pipe 13 (i.e. conduit) is preferably from 5 to 1,000 mm, more preferably from 10 to 500 mm.

With regard to the monolithic refractory layer 18, the total thickness in the radial direction of the uprising pipe 13 is preferably from 1 to 500 mm, more preferably from 2 to 500 mm.

On the other hand, with regard to the refractory bricks 17a constituting the refractory brick layer 17, the total thickness of the refractory bricks 17a in the radial direction of the uprising pipe 13 is preferably from 5 to 1,000, mm, more preferably from 10 to 1,000 mm.

The total thickness of the refractory layer 16 in the radial direction of the uprising pipe 13 is preferably from 6 to 1,500 mm, more preferably from 12 to 1,000 mm.

With regard to the thermal insulating material layer 19, the total thickness of the solid thermal insulating material layer in the radial direction of the uprising pipe 13 is preferably from 4 to 500 mm, more preferably from 10 to 500 mm.

Although the above explanation has been made about a case where the conduit structure is applied to the uprising pipe 13 of a vacuum degassing apparatus, a similar structure may be also applied to the downfalling pipe 14 and a vacuum degassing vessel.

Figure 4:
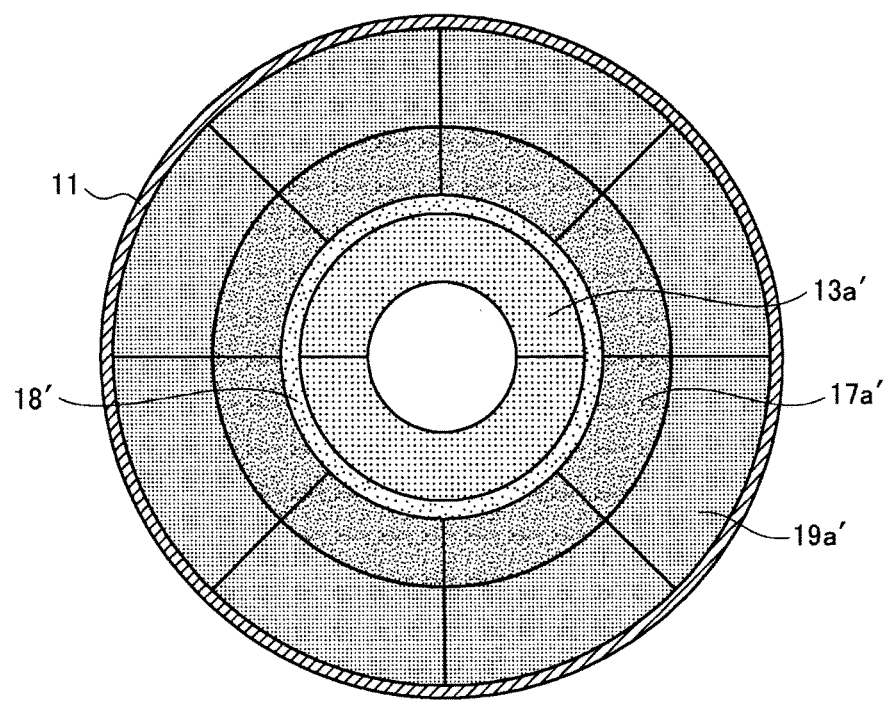
FIG. 4 is a view similar to FIG. 3, although the conduit structure has a cross-sectional shape different from the conduit shown in FIG. 3.

Although the conduit structure according to the present invention has been described in reference to the figures, the conduit structure according to the present invention is not limited to the shown modes. For example, the conduit made of fused cast refractories may have any shape as long as it has at least a hollow structure. The conduit may have any shape in section in addition to a rectangular shape in section. FIG. 4 shows another form of the conduit structure according to the present invention, wherein the conduit constituted by fused cast refractories 13a' disposed so as to have a circular shape in section. In FIG. 4, two fused cast refractories 13a', each of which has an arc-shaped contour and has a semi-circular notch formed therein, are combined to form a hollow pipe structure which is circular in section and has a hollow portion formed in a circular shape in section. In FIG. 4, a refractory brick layer 17a' is disposed outside the fused cast refractories 13a', and a thermal insulating material layer 19a' is disposed outside the refractory brick layer 17a'. A monolithic refractory layer 18' is disposed between the fused cast refractories 13a' and the refractory brick layer 17a'. Each of the monolithic refractory layer 18', the refractory brick layer 17a' and the thermal insulating material layer 19a' is formed in a circular shape in section. A vacuum housing 11, which houses the fused cast refractories 13a' and its backup (the monolithic refractory layer 18', the refractory brick layer 17a' and the thermal insulating material layer 19a'), is also formed in a circular shape in section.

The conduit made of fused cast refractories may be formed in any shape in section, in addition to a rectangular or circular shape in section. For example, the conduit may be a hollow pipe formed in an elliptical shape or a hollow pipe which is formed in a polygonal shape in section, such as a hexagonal shape in section or an octagonal shape in section, instead of being rectangular in section. The hollow portion serving as the flow path for molten glass may be formed in any shape in section, instead of being circular in section. For example, the hollow portion may be formed in an elliptical shape in section or in a polygonal shape in section, such as a rectangular shape in section, a hexagonal shape in section or an octagonal shape in section. When the conduit made of fused cast refractories is a hollow pipe having another shape, it is sufficient to use fused cast refractories having a desired shape in accordance with the sectional shape of a desired conduit and the sectional shape of the hollow portion in it.

The arrangement of the refractory bricks in the refractory layer, and the arrangement of the solid refractory in the thermal insulating material layer may be also properly selected according to the cross-sectional shape of a desired conduit.

In the vacuum degassing process for molten glass according to the present invention, a vacuum degassing apparatus with the conduit structure according to the present invention applied to at least one of an uprising pipe, a vacuum degassing layer and a downfalling pipe is used such that the molten glass supplied from a melting vessel is caused to pass through the vacuum degassing vessel with the inside thereof being decompressed to a certain degree of decompression, whereby the molten glass is vacuum-degassed.

Since the uprising pipe and the downfalling pipe of the vacuum degassing apparatus are under decompression, the pressure of the molten glass is applied to the pipe walls of the uprising pipe and the downfalling pipe such that a glass basis material is more likely to ooze out in comparison with a case where both pipes are under normal pressure. From this viewpoint, the present invention is carried out such that the conduit structure according to the present invention is applied to at least one of the uprising pipe and the downfalling pipe, preferably both of the pipes to advantageously minimize the glass leakage more effectively. The conduit structure according to the present invention may be applied to at least a portion of the uprising pipe or the downfalling pipe where glass leakage is likely to occur.

Further, since the vacuum degassing vessel is also under decompression, molten glass is likely to ooze out as in the uprising pipe and the downfalling pipe. In addition, in many cases, the vacuum degassing vessel is thick in the refractory layer or the thermal insulating material layer because of storing more molten glass in comparison with the uprising pipe or the downfalling pipe. Further, because the vacuum degassing vessel is supported by the refractory layer or the thermal insulating material layer, the vacuum degassing vessel becomes structurally unstable in some cases when a glass basis material oozes out. In accordance with the present invention, it is possible to favorably solve these problems by applying the conduit structure according to the present invention to the vacuum degassing vessel.

In the vacuum degassing process for molten glass according to the present invention, it is preferred that the molten glass be continuously supplied to and discharged from the vacuum degassing vessel.

In order that a temperature difference is prevented to be produced between the molten glass supplied from the melting furnace and the inside of the vacuum degassing vessel, the vacuum degassing vessel is preferably heated to have a temperature in a temperature range of from 1,100 to 1,500° C., in particular from 1,250 to 1,450° C. therein. It is preferred in terms of productivity that the molten glass have a flow rate of from 1 to 1,000 ton/day. When the vacuum degassing process is performed, the inside of the vacuum degassing vessel disposed in the vacuum housing is kept under a certain decompressed state by evacuating the inside of the vacuum housing by, e.g. a vacuum pump from outside. The inside of the vacuum degassing vessel is decompressed to preferably from 38 to 460 mmHg (from 51 to 613 hPa), more preferably from 60 to 253 mmHg (from 80 to 338 hPa).

There is no limitation to the glass degassed by the present invention as long as the glass is produced by heating and melting. When the glass degassed by the present invention is silicate glass containing an alkali component, the glass is more likely to be made heterogeneous so as to be subjected to a significant change in viscosity because the original viscosity of the silicate glass is relatively low. The effect of the present invention is largely demonstrated particularly in the case of soda lime glass. The reason is that when soda lime glass oozes out in a conduit structure, soda lime glass is likely to be made heterogeneous because of having a low alumina content, and has a large viscosity-increasing effect by being made heterogeneous.

Specific examples of the glass base composition of the molten glass include the following compositions:

In the following compositions, the numerical limitations are shown in percent by mass on an oxide basis. There are mentioned a composition including from 65 to 75% of $SiO_2$, from 0 to 5% of $Al_2O_3$, from 0 to 15% of CaO, from 0 to 15% of MgO, from 10 to 20% of $Na_2O$, and from 0 to 3% of $K_2O$, and a composition including from 65 to 75% of $SiO_2$, from 0 to 5% of $Al_2O_3$, from 5 to 15% of CaO, from 0 to 15% of MgO, from 10 to 20% of $Na_2O$, and from 0 to 3% of $K_2O$, which is a preferable example. There is also mentioned a composition including from 65 to 75% of $SiO_2$, from 0 to 3% of $Al_2O_3$, from 5 to 15% of CaO, from 0 to 15% of MgO, from 10 to 20% of $Na_2O$, and from 0 to 3% of $K_2O$, which is the most preferable example.

The dimensions of the respective constituent elements of the vacuum degassing apparatus may be properly selected according to a used vacuum degassing apparatus. In the case of the vacuum degassing vessel 12 shown in FIG. 1, specific examples of its dimensions are as follows. It should be noted that each of the outer size and the inner size in a rectangular section indicates the size of one side.

Length in horizontal direction: from 1 to 20 m
Outer size (rectangular in section): from 1 to 7 m
Inner size (rectangular in section): from 0.2 to 3 m
Specific examples of the dimensions of the uprising pipe 13 and the downfalling pipe 14 are as follows:
Length: from 0.2 to 6 m, preferably from 0.4 to 4 m
Outer size (rectangular in section): from 0.5 to 7 m, preferably from 0.5 to 5 m
Inner size (rectangular in section): from 0.05 to 0.8 m, preferably from 0.1 to 0.6 m The above-mentioned arrangement of the fused cast refractory layer, the monolithic refractory layer, the refractory brick layer and the thermal insulating material layer may be applied to a glass melting furnace as well.

The bottom of the glass melting furnace which is brought into direct contact with molten glass, is constituted by fused cast refractories which is excellent in heat resistance and corrosion resistance to the molten glass. When the glass melting furnace is required to have a thermal insulating structure, a refractory brick layer is disposed outside the fused cast refractories, and a thermal insulating material layer is disposed outside the refractory brick layer. In this arrangement, a monolithic refractory layer is disposed between the fused cast refractories and the refractory brick layer; and the fused cast refractories, the monolithic refractory forming the monolithic refractory layer, and the refractory bricks constituting the refractory brick layer are selected such that the thermal insulating material layer contains a portion that has a temperature equal to the flow point of the molten glass when the molten glass is present in the glass melting furnace. This arrangement is helpful to reduce the amount of the fused cast refractories used in the glass melting furnace and the refractory bricks constituting the refractory brick layer. Thus, the production cost of the glass melting furnace is reduced.

The above-mentioned conditions for the uprising pipe and the downfalling pipe are correspondingly applicable to the ranges of the thickness of each of the brick layers (made of the fused cast refractories and of the refractory bricks), the monolithic refractory layer, and the thermal insulating material layer in this case. The temperature range of the molten glass in operation and the method for filling the monolithic refractory are the same as the prior art.

EXAMPLES

Now, the present invention will be more specifically described based on Examples. It should be noted that the present invention is not limited to the Examples. In each of the following Examples, a monolithic refractory (castable refractory) having a composition shown in Table 1 was used in a monolithic refractory layer.

TABLE 1

| Content (%) | Ex. 1, Ex. 2 | Ex. 3 |
|---|---|---|
| $Al_2O_3$ | 91 | 52 |
| $ZrO_2$ | — | 33 |
| $SiO_2$ | 7 | 13.5 |
| $TiO_2$ | — | 0.04 |
| $Fe_2O_3$ | 0.2 | 0.1 |
| $Na_2O$ | — | 1.3 |

In each Example, how the monolithic refractory layer made molten glass heterogeneous was evaluated by the following procedure.

A glass basis material was placed on each monolithic refractory and was left as it is for 1 week at 1,200° C. for Example 1 and at 1,300° C. for Example 2, followed by being cooled to room temperature for about 6 hours. Each monolithic refractory layer with the glass adhering thereon was sliced, each cut face was polished, and the glass composition in a portion of each monolithic refractory close to the interface to the glass basis material was subjected to quantitative analysis by an electron probe microanalyzer (EPMA). Further, glass having the same composition as the one obtained by the quantitative analyses was prepared, and the viscosity of the glass was measured. Table 2 shows the composition of the glass having been made heterogeneous in each of Examples 1 to 3, and these viscosities.

The compressive strength of each monolithic refractory layer was evaluated by the method prescribed in JIS R2206-1991. The evaluation result showed that each monolithic refractory layer had a compressive strength of 140 MPa.

TABLE 2

| Component | Molten glass | Example 1 | Example 2 | Example 3 |
|---|---|---|---|---|
| $SiO_2$ | 71.9% | 61.9% | 55.3% | 59.8% |
| $Al_2O_3$ | 2.0% | 20% | 25.1% | 17.8% |
| $MgO$ | 3.3% | 1.4% | 1% | 2.4% |
| $CaO$ | 12.7% | 2.5% | 3% | 4.1% |
| $Na_2O$ | 13.5% | 14% | 15.5% | 11.9% |
| $K_2O$ | 0.9% | 0% | 0% | 0.2% |
| $Fe_2O_3$ | 0.5% | 0.1% | 0.1% | 0.1% |
| $T\log\eta = 2$ | 1483° C. | 1746° C. | 1738° C. | 1667° C. |
| $T\log\eta = 4$ | 1039° C. | 1304° C. | 1304° C. | 1226° C. |
| $T\log\eta = 5$ | 913° C. | 1156° C. | 1160° C. | 1082° C. |

In each of Examples 1 and 2, the molten glass was made heterogeneous with the result that the temperatures used as the indices indicative of the high temperature viscosity of glass ($T\log\eta = 2$ and $T\log\eta = 4$) were increased by about 300° C. In Example 3, the temperatures corresponding to $T\log\eta = 2$ and $T\log\eta = 4$ were increased by about 180° C. These results reveal that even when molten glass has oozed out of a joint between fused cast refractories 13a constituting a conduit in the case of the vacuum degassing apparatus of Example 4 described later, the molten glass thus having oozed out is controlled so as not to further ooze out into the refractory layer 17 disposed outside the monolithic refractory layer 18. While the molten glass is passing through the refractory brick layer 17, the molten glass is further made highly viscous such that the oozing-out of the molten glass stops in the refractory brick layer 1. Thus, the molten glass is unlikely to arrive at the thermal insulating material layer 19 disposed outside the refractory brick layer 17.

Comparative Example 1

In Comparative Example 1, a monolithic refractory (tamping material) that had a small amount of $Al_2O_3$ as shown in the composition described in Table 3 was used in the monolithic refractory layer, and how the molten glass was made heterogeneous was evaluated in the same procedure as Examples 1 to 3. Table 4 shows the composition of the glass basis material, the composition of the glass having been made heterogeneous, and the viscosities of the glass.

TABLE 3

| Component | Content (%) |
|---|---|
| $Al_2O_3$ | 0.6 |
| $ZrO_2$ | 65 |
| $SiO_2$ | 33 |
| $TiO_2$ | 0.7 |
| $Fe_2O_3$ | 0.3 |
| $Na_2O$ | 0 |

TABLE 4

| Component | Molten glass | Comparative Example 1 |
|---|---|---|
| $SiO_2$ | 71.9% | 68.2% |
| $Al_2O_3$ | 2.0% | 2.3% |
| $MgO$ | 3.3% | 4.0% |
| $CaO$ | 9.1% | 8.4% |
| $ZrO_2$ | 0% | 4.0% |
| $Na_2O$ | 12.7% | 10.5% |
| $K_2O$ | 0.9% | 2.1% |
| $Fe_2O_3$ | 0.5% | 0.5% |
| $T\log\eta = 2$ | 1483° C. | 1495° C. |
| $T\log\eta = 4$ | 1039° C. | 1068° C. |
| $T\log\eta = 5$ | 913° C. | 966° C. |

It is revealed that Comparative Example has a small increase in the glass viscosity caused by making the molten glass heterogeneous in comparison with Examples 1 to 3, failing to control the oozing out of the molten glass.

Example 4

In this Example, a vacuum degassing apparatus 1 as shown in FIG. 1 is used to perform the vacuum degasing of molten glass. The vacuum degassing apparatus 1 has an uprising pipe 13, a downfalling pipe 14 and their surrounding members configured as shown in FIG. 2. The constituent materials of the respective members of the vacuum degassing apparatus 1 are as follows:
Vacuum housing 11: stainless steel
Vacuum degassing vessel 12: fused cast refractories
Uprising pipe 13 and downfalling pipe 14: fused cast refractories The uprising pipe 13 is configured such that paired fused cast refractory 13a (made of alumina-based fused cast refractories) are combined so as to have a shape shown in FIG. 3, and that such pairs of fused cast refractories are stacked one after another along the longitudinal direction of the uprising pipe 13. The downfalling pipe 14 is also configured to have the same structure as the uprising pipe 13.

Extension pipes 20 and 21: platinum

Each of the uprising pipe 13 and the downfalling pipe 14 is surrounded by a backup 15 configured as shown in FIG. 2.

Specifically, as the backup 15, a refractory layer 16 is disposed outside the uprising pipe 13, and a thermal insulating material layer 19 is disposed outside the refractory layer 16. The refractory layer 16 includes a refractory brick layer 17 which is made of refractory bricks 17a (made of dense fired bricks) disposed along a circumferential direction of the uprising pipe 13. It should be noted that the fused cast refractories 13a constituting the uprising pipe 13, and the refractory bricks 17a constituting the refractory brick layer 17 had a gap having a width of 30 mm therebetween. The monolithic refractory used in Example 1 was filled into the gap, and the monolithic refractory was heated at 1,300° C. to be sintered, whereby a monolithic refractory layer 18 was formed in the refractory layer 16.

The thermal insulating material layer 19 is a solid thermal insulating material layer which is made by disposing solid thermal insulating materials 19a (such as, diatomite-based thermal insulating bricks, fire clay thermal insulating bricks or high alumina-based thermal insulating bricks) along the circumferential direction of the uprising pipe 13. The refractory bricks 17a constituting the refractory brick layer 17 and the solid thermal insulating materials 19a constituting the solid thermal insulating material layer are stacked along the longitudinal direction of the respective layers. In the thermal insulating material layer 19, thermal insulating materials having a porous structure (not shown) are filled between the thermal insulating material layer and the vacuum housing 11.

The specific structures of the uprising pipe 13, and the refractory layer 16 (made of the monolithic refractory layer 18 and the refractory brick layer 17) and the thermal insulating material layer 19 constituting the backup 15 are shown in Table 5. These specific structures are also applied to the downfalling pipe 14 and the backup 15 therefor. In Table 5, A, C, B and D represent dense alumina-based fused cast refractories, dense alumina/zirconia-based fired bricks, high alumina-based casting material and solid thermal insulating materials, respectively.

TABLE 5

| | | Bulk specific gravity | Thermal conductivity (kcal/mh ° C.) | Thickness (mm) | Inner surface temperature (° C.) | Outer surface temperature (° C.) |
|---|---|---|---|---|---|---|
| Uprising pipe | A | 3.54 | 3.974 | 100 | 1200 | 1180 |
| Monolithic refractory layer | B | 3.2 | 3.6 | 30 | 1180 | 1167 |
| Refractory brick | C | 3.1 | 1.521 | 100 | 1167 | 1090 |
| Thermal insulating material layer | D | 0.4 | 0.1074 | 150 | 1090 | 114 |

The vacuum degassing of the molten glass is performed under the following conditions:
Temperature in vacuum degassing vessel 12: 1,200° C.
Pressure in vacuum degassing vessel 12: 180 mmHg (240 hPa)
Molten glass: soda lime glass (having a flow point of 920° C.)
Flow rate: 50 ton/day With regard to the fused cast refractories 13a constituting the uprising pipe 13, the monolithic refractory layer 18, the refractory bricks 17a constituting the refractory brick layer 17, and the solid refractories 19a and the Microtherm molded products constituting the thermal insulating material layer 19, the temperatures on the inner wall sides (inner surface temperatures) and the temperatures on the outer wall sides (outer surface temperatures) of these members are measured by use of a thermocouple when performing the vacuum degassing. The results are shown in Table 5. As clearly shown in Table 5, the thermal insulating material layer 19 contains a portion that has a temperature equal to the flow point of the molten glass (temperature of 920° C.) when the molten glass is passing through the conduit.

After 6 months have passed since the vacuum degassing operation started, it is observed that the solid refractories 19a constituting the thermal insulating material layer 19 has no sign of corrosion caused by the molten glass. The bricks have not cracked.

The specific structure of a conventional uprising pipe 13 and the refractory layer 16 (refractory brick layer 17) and the thermal insulating material layer 19 constituting the backup 15 (conventional configuration) are shown in Table 6. In Table 6, E represents chamotte-based fired bricks.

TABLE 6

|  |  | Bulk specific gravity | Thermal conductivity (kcal/ mh ° C.) | Thickness (mm) | Inner surface temperature (° C.) | Outer surface temperature (° C.) |
| --- | --- | --- | --- | --- | --- | --- |
| Uprising pipe | A | 3.54 | 3.974 | 100 | 1200 | 1183 |
| Refractory brick layer | C | 3.1 | 1.521 | 250 | 1183 | 1056 |
|  | E | 2.29 | 0.9876 | 200 | 1056 | 915 |
| Refractory brick | D | 0.4 | 0.1074 | 130 | 915 | 104 |

In this structure, the refractory brick layer contains a portion that has a temperature equal to the flow point of glass (temperature of 920° C.), which means that this structure corresponds to the conduit structure disclosed in Patent Document 2.

In the structure of Example 4, only the thicknesses of the refractory brick layer 17 and the thermal insulating material layer 19 are set at modified values based on the results of Examples 1 and 2.

According to the results of Example 1 and 2, the structure shown in Table 7 is also applicable. This conduit structure for molten glass is characterized to be constituted by a conduit and a backup disposed around the conduit; the conduit being a hollow pipe made of fused cast refractories disposed along longitudinal and circumferential directions thereof; the backup being constituted by a refractory layer outside the conduit, and a thermal insulating material layer disposed outside the refractory layer; the refractory layer including a monolithic refractory layer disposed along the longitudinal and circumferential directions of the conduit and formed by placing a monolithic refractory containing from 30 to 100% of $Al_2O_3$ and from 0 to 70% of $SiO_2$ in percent by mass on an oxide basis and sintering the monolithic refractory; the thermal insulating material layer containing a solid thermal insulating material layer made by disposing solid thermal insulating materials along the longitudinal and circumferential directions of the conduit; the fused cast refractories constituting the conduit, the monolithic refractory constituting the refractory brick layer and the refractory bricks constituting the refractory brick layer are selected such that the thermal insulating material layer contains a portion that has a temperature equal to the flow point of the molten glass when the molten glass passes through the conduit. In this structure, no refractory brick layer 17 is disposed, the refractory layer 16 is formed by only the monolithic refractory layer 18, and the thermal insulating material layer 19 is disposed outside the monolithic refractory layer 18. Even in this arrangement, even if molten glass oozes out of a joint between fused cast refractories constituting the conduit, the molten glass thus having oozed out is controlled so as not to further ooze out into the thermal insulating material layer disposed outside the monolithic refractory. Even in this arrangement, the thermal insulating material layer 19 contains a portion that has a temperature equal to the flow point of the molten glass when the molten glass passes through the conduit.

TABLE 7

|  |  | Bulk specific gravity | Thermal conductivity (kcal/mh ° C.) | Thickness (mm) | Inner surface temperature (° C.) | Outer surface temperature (° C.) |
| --- | --- | --- | --- | --- | --- | --- |
| Uprising pipe | A | 3.54 | 3.974 | 100 | 1200 | 1183 |
| Monolithic refractory layer | B | 3.2 | 3.6 | 30 | 1183 | 1163 |
| Thermal insulating material layer | D | 0.4 | 0.1074 | 200 | 1163 | 104 |

INDUSTRIAL APPLICABILITY

The conduit structure for molten glass according to the present invention is applicable to a conduit for molten glass in a glass producing apparatus and is more specifically applicable to the uprising pipe, the vacuum degassing vessel or the downfalling pipe of a vacuum degassing apparatus. By using the conduit structure for molten glass, it is possible to eliminate the provision of a cooling means and to extend the service life of a vacuum degassing apparatus for molten glass and reduce the production cost. By using the vacuum degassing apparatus, it is possible to extend the service life of the glass producing apparatus and the glass melting furnace. Further, by using the vacuum degassing apparatus or the glass producing apparatus, it is possible to provide a vacuum degassing process for molten glass and a process for producing glass having a further extended service life, which are very effective in the field of glass production.

This application is a continuation of PCT Application No. PCT/JP2014/058350 filed on Mar. 25, 2014, which is based upon and claims the benefit of priority from Japanese Patent Application No. 2013-091280 filed on Apr. 24, 2013. The contents of those applications are incorporated herein by reference in their entireties.

REFERENCE SYMBOLS

1: vacuum degassing apparatus
11: vacuum housing
12: vacuum degassing vessel
13: uprising pipe
13a, 13a': fused cast refractory
14: downfalling pipe
15: backup 16: refractory layer
17, 17a': refractory brick layer
17a: refractory brick
18, 18': monolithic refractory layer
19, 19a': thermal insulating material layer
19a: solid thermal insulating materials (solid thermal insulating material layer)
20, 21: extension pipe
20a: fixing flange
20b: sealing flange
22: thermal insulating material
30: melting furnace
40: treatment bath

What is claimed is:

1. A process for vacuum-degassing molten glass, the process comprising:
passing a molten glass through an uprising pipe, a vacuum degassing vessel and a downfalling pipe of a vacuum degassing apparatus,
wherein at least one of the uprising pipe, the vacuum degassing vessel and the downfalling pipe has a conduit structure comprising:
a conduit; and
a backup disposed around the conduit,
wherein:
the conduit is a hollow pipe made of fused cast refractories disposed in longitudinal and circumferential directions thereof;
the backup comprises:
a refractory layer surrounding the conduit; and
a thermal insulating material layer disposed outside the refractory layer;
the refractory layer comprises:
a refractory brick layer made of refractory bricks disposed along the longitudinal and circumferential directions of the conduit; and
a monolithic refractory layer formed by sintering a monolithic refractory comprising at least 30% of $Al_2O_3$ and from 7 to 70% of $SiO_2$ by mass on an oxide basis;
the thermal insulating material layer comprises solid thermal insulating materials disposed along the longitudinal and circumferential directions of the conduit; and
the fused cast refractories constituting the conduit, the monolithic refractory forming the refractory brick layer and the refractory bricks constituting the refractory brick layer are each selected such that the thermal insulating material layer contains a portion that has a temperature equal to the flow point of the molten glass when the molten glass passes through the conduit.

2. The process according to claim 1, wherein the molten glass that passes through the conduit structure has a temperature of from 1,000 to 1,500° C.

3. The process according to claim 2, wherein the molten glass comprises from 65 to 75% of $SiO_2$, from 0 to 5% of $Al_2O_3$, from 0 to 15% of CaO, from 0 to 15% of MgO, from 10 to 20% $Na_2O$, and from 0 to 3% of $K_2O$ by mass on an oxide basis.

4. The process according to claim 1, wherein the monolithic refractory further comprises $Na_2O$.

5. The process according to claim 1, wherein the monolithic refractory further comprises $Fe_2O_3$.

6. The process according to claim 1, wherein the refractory bricks have thermal conductivity at 1000° C. of more than 0.3 W/mK, and the solid thermal insulating materials have a thermal conductivity at 1000° C. of at most 0.3 W/mK.

* * * * *